United States Patent
Kollath et al.

[19]

[11] Patent Number: 6,023,881
[45] Date of Patent: Feb. 15, 2000

[54] PLANT PROTECTION BAG

[76] Inventors: Richard C. Kollath, 12336 Rollingwood Ct., Gulfport, Miss. 39503; Richard L. Huffman, 520 Beach Blvd., Apt. No. 501, Biloxi, Miss. 39530

[21] Appl. No.: 08/861,086

[22] Filed: May 21, 1997

[51] Int. Cl.[7] .............................. A01G 13/00; B65D 30/08
[52] U.S. Cl. .................................................. 47/26; 383/113
[58] Field of Search ........................ 47/65.8, 26, 21, 47/28.1, 30; 383/113, 38; 426/248

[56] References Cited

U.S. PATENT DOCUMENTS

| | | | |
|---|---|---|---|
| 4,159,596 | 7/1979 | Downing | 47/58 |
| 4,646,467 | 3/1987 | Morrisroe | 47/26 |
| 4,698,226 | 10/1987 | Guthrie | 426/248 |
| 4,863,287 | 9/1989 | Marsik | 383/113 |
| 5,406,746 | 4/1995 | Hoshino | 47/21 |
| 5,535,543 | 7/1996 | Alexander | 47/26 |
| 5,564,223 | 10/1996 | Takita | 47/26 |
| 5,659,997 | 8/1997 | Spreche et al. | 47/1.1 |
| 5,697,707 | 12/1997 | Esposito | 383/38 |
| 5,715,629 | 2/1998 | Hawkins | 47/65.5 |

FOREIGN PATENT DOCUMENTS

| | | | |
|---|---|---|---|
| 2476435 | 8/1981 | France | 47/261 F |
| 5032219 | 3/1971 | Japan | 47/26 |
| 135126 | 4/1978 | Japan | 47/261 F |
| 356009525 | 1/1981 | Japan | 47/261 F |
| 3187323 | 8/1989 | Japan | 47/261 F |
| 3180124 | 12/1989 | Japan | 47/261 F |
| 16835 | 7/1904 | United Kingdom | 47/261 F |
| 707712 | 4/1954 | United Kingdom | 47/261 F |

*Primary Examiner*—Michael J. Carone
*Assistant Examiner*—Fredrick T. French, III

[57] ABSTRACT

A protective bag for placing over fruit, vegetables, and entire small plants. The bag is fabricated from a perforated material passing sunlight, water, and air, but having perforations sufficiently small to exclude insects. The bag is closed by a liner at the neck of the bag of beeswax, metal foil, or any material which is malleable and holds its configuration after pinching or other manipulation. This characteristic enables the bag to have an opening of any size less than that of the fully open neck, to locate the opening anywhere along the neck, and to be closed when the bag is placed over a fruit. Optionally, the bag is colored with a hue selected to discourage a selected insect pest.

7 Claims, 2 Drawing Sheets

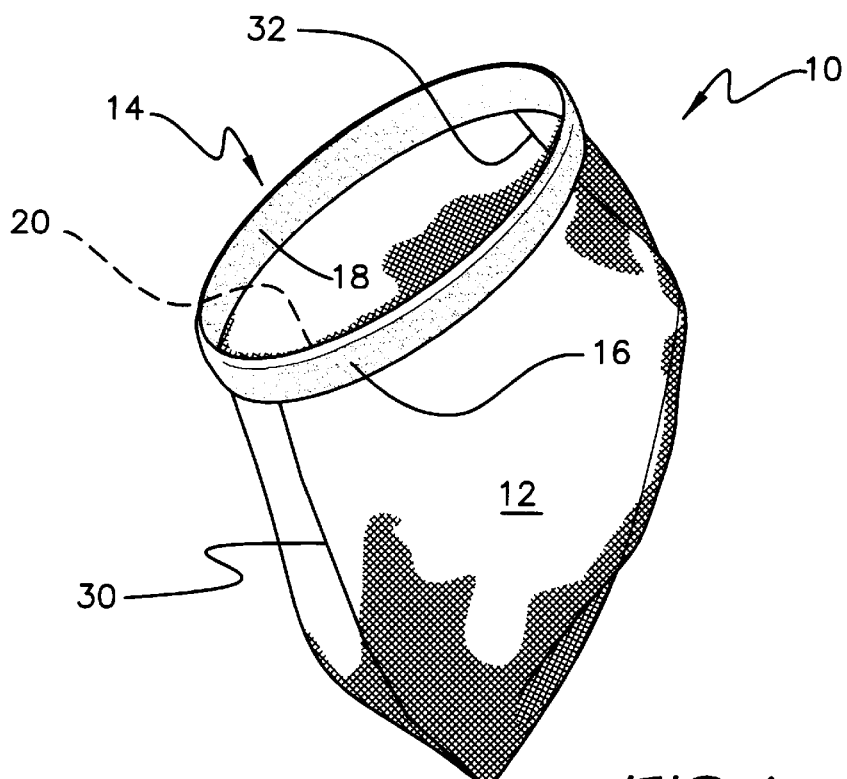
FIG. 1
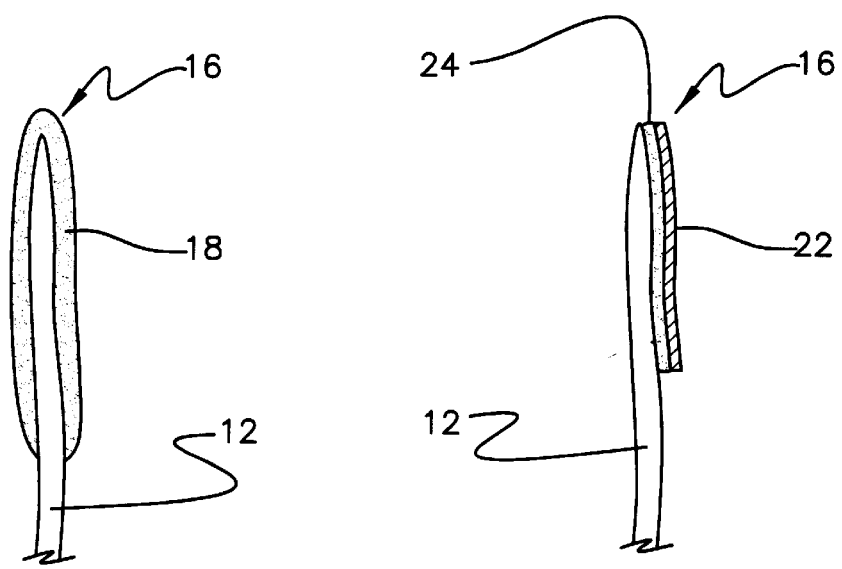
FIG. 2
FIG. 3

PLANT PROTECTION BAG

BACKGROUND OF THE INVENTION

1. Field of the Invention

The present invention relates to a flexible bag suitable for being installed over and protecting a growing plant. The fabric of the bag is permeable to sunlight, air, and water, but prevents entry of pests such as insects. The bag closure utilizes inelastic deformation to remain closed.

2. Description of the Prior Art

Conditions promoting plant growth are beset by the paradox that exposure to beneficial effects, such as sunlight, air, and water, also expose the plant to attack by predatory pests. Growers of fruits and vegetables have resorted to protective blankets laid upon low growing plants for providing a barrier to pests. These protective webs may be fabricated from woven filaments or may otherwise be provided with perforated surfaces in order to pass sunlight, water, and air, and thus do not deprive the growing plant of these necessities.

However, as the plants grow and displace the protective blanket, gaps between the blanket and the ground enable pests previously excluded to enjoy access to the plants. Therefore, blankets must be repositioned, and possibly must be modified in area. This is not a practical solution to the problem.

Protective bags are a better answer in many situations since they may be applied selectively to the fruit or other edible portion of the entire plant. Leaves are exposed to sunlight for photosynthesis, while providing protection to the fruit or vegetable. Examples of protective bags are seen in U.S. Pat. No. 4,646,467, issued to John P. Morrisroe on Mar. 3, 1987, U.S. Pat. No. 4,698,226, issued to David W. Guthrie on Oct. 6, 1987, and U.S. Pat. No. 5,406,746, issued to Atsushi Hoshino on Apr. 18, 1995. In each prior art patent, the subject bag has a drawstring. Guthrie does not specify a closure type, since labeling, and not closure, is the purpose of his invention. By contrast to these prior art bags, the present invention has a closure which enables the closure to be closed to a predetermined extent. Also, arrangement of the closure enables the opening to be located where desired along the neck of the bag. These properties are conferred by the nature of the closure disposed upon the neck of the bag.

None of the above inventions and patents, taken either singly or in combination, is seen to describe the instant invention as claimed.

SUMMARY OF THE INVENTION

The present invention provides a protective barrier which offers the convenience of a closure formed and maintained closed by pinching or similar manipulation. Additionally, it offers considerable latitude in locating the opening surrounding the stem of the enclosed fruit, vegetable, or other portion of the plant protected by enclosure within the bag. The novel bag is formed from a material which is permeable to sunlight, air, and water, but which provides a barrier to insects and other pests.

The principal novel feature is the closure. The bag has a neck or opening which is not necessarily of less diameter than that of the bag. The closure comprises an inelastically deformable lining applied to the neck on either the interior or exterior surface thereof. The bag may be closed by pinching or constricting the neck until one side of the neck contacts the other side. Contacting sides will remain closed against one another due to engagement of the deformable lining. This lining may be any suitable material which deforms under manual pressure and holds the attained configuration. Suitable materials include wax and metal foils. These materials will generally conform to the stem of the plant as the stem passes through the opening of the bag. Materials such as wax thereby close even small gaps past which small insects could crawl to gain access to the protected portion of the plant.

This arrangement of the neck has two implications. One is that the opening may be restricted to any selected portion of the original extent of the neck. The second implication is that the remaining opening, after partial constriction of the neck, may be located where desired along the original extent of the neck. This enables adjustment of position of the novel bag on the plant. The bag may be positioned to avoid interference with blossoms, young leaves, or to reduce conspicuousness of the bag for aesthetic purposes.

The lining enabling closure may be beeswax, or a material exhibiting similar properties. This material has sufficient cohesiveness to remain sealed once the neck of the bag is pinched, but is easily subsequently reopened by hand since waxes do not set permanently. Alternatively, a material such as metal foil may be employed in place of beeswax. Metal foils are readily crushed by hand and hold their shape once crushed.

Accordingly, it is a principal object of the invention to provide a bag for protecting fruits, vegetables, and other parts of a growing plant.

It is another object of the invention to provide a protective bag having a neck closed by self-closing material.

It is a further object of the invention that the bag be permeable to sunlight, water, and air.

Still another object of the invention is to enable the neck of the bag to be closed to any selected degree and at any selected area along the original neck.

An additional object of the invention is to close the opening of the bag at the neck, leaving no gaps through which small insects may enter.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of one embodiment of the invention.

FIG. 2 is a side cross sectional detail view of a lip of the novel bag, showing one form of a suitable closing material.

FIG. 3 is a side cross sectional detail view of a lip of the novel bag, showing an alternative embodiment of closing material.

DETAILED DESCRIPTION OF THE PREFERRED EMBODIMENTS

Figure 4:
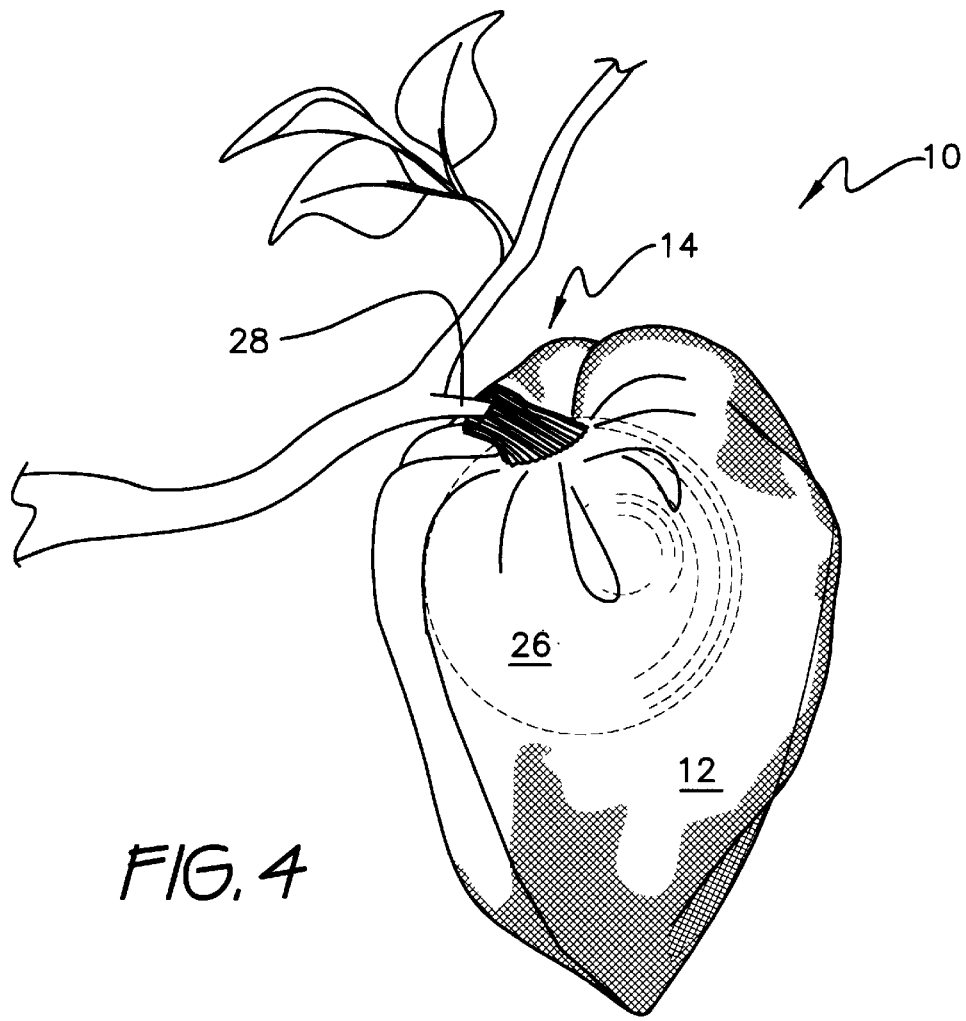
FIG. 4 is an environmental, perspective detail view of the invention showing the novel bag closed over the stem of a fruit of a tree.

Turning now to FIG. 1 of the drawings, novel bag 10 is seen to comprise a closed body 12 and a neck 14 lined with a suitable lining 16 comprising a malleable material which closes neck 14 by inelastic deformation, and which maintains that configuration attained after being squeezed, pinched, or otherwise manipulated. Body 12 is closed in the sense of having continuous construction throughout, there being no hole or gap greater than the pores of the constituent material. The constituent material is a lightweight fabric having minute perforations permeable to sunlight, water, and air, but of diameters small enough to exclude any known insect pest. Suitable fabrics are commercially available from gardening supply firms, such as Gardens Alive of Lawrenceburg, Ind., which distributes a product it identifies as "Polypropylene Floating Row Cover".

Neck 14 may be closed selectively in a selected location along its length or extent, and is maintained closed by the nature of the constituent material of lining 16. Several different types of materials will satisfy the requirement that the constituent material hold its configuration after being manipulated. For example, as shown in FIG. 2, lining 16 may comprise wax 18. Wax 18 has adhesive properties and cohesive properties of greater attraction than those of adhesive properties. Lining 16 will therefore adhere to bag 10 and also to plant stems. Also, bag 10 can be pulled open by human manual effort after sealing said neck.

One example of a suitable wax 18 is beeswax. Beeswax is representative of any suitable material which will bond to itself upon contact and application of a slight degree of compressive force, in addition to holding or maintaining a configuration achieved after pinching two layers of wax together. The general nature of the material is that once compressed against one another, two surfaces 18, 20 of neck 14 will adhere to one another, thereby closing neck 14 of bag 10. That is, the bond will not harden, rather remaining susceptible to opening by pulling surfaces 18, 20 apart by manual effort. This characteristic requires that the selected wax have predetermined cohesive properties in addition to adhesive properties.

Beeswax is but one suitable wax. Beeswax will not affect plants adversely. Beeswax is suitable for coating neck 14 by melting the beeswax and subsequently dipping neck 14 in melted beeswax. Dipping neck 14 into molten wax will result in both sides of the wall of body 12 being coated, as shown in FIG. 2. Coating both sides of the wall of body 12 assures that a relatively great surface area of the layer of wax 18 be exposed to bag 12, so that wax 12 will tend to adhere securely to bag 10. However, there is no requirement that both sides of the wall of body 12 be coated.

Other materials which may possibly prove suitable for certain edible and aesthetic plants include mixtures of pliable materials and glue, putty, synthetic waxes, and other materials having similar performance characteristics. A synthetic wax is one synthesized chemically, or obtained by artificial purification or concentration of natural paraffin or similar materials.

A second class of inelastically deformable materials is provided by metal foils. A suitable metal and thickness of the foil are selected so that when the foil is bent beyond the elastic limit of the foil, the foil maintains a folded or crumpled configuration. As illustrated in FIG. 3, lining 16 may comprise a stratum of metal foil 22 adhered or bonded to the wall of body 12 of bag 10. In the embodiment depicted in FIG. 3, foil 22 is provided by metal tape provided with a stratum of adhesive 24. A suitable such tape 22 having an adhesive backing 24 is found in a product commercially available from 3M Corporation of St. Paul, Minn., as Scotch 305, number 5136-03-05. This product is a thin metal foil tape having an adhesive backing. Of course, foil 22 may be provided in forms other than prefabricated tapes prefabricated to include adhesive backing.

The mechanism by which metal foil holds bag 10 closed is not, strictly speaking, adhesive. Rather, pinching or crumpling wherein foil 22 causes foil 22 to interlock to itself by interfitting or interengagement of many small localized projections created when foil 22 is crumpled or folded. Closing of bag 10 by foil 22 shares with the embodiment of FIG. 2 the characteristic that lining 16 deforms inelastically to hold the closed configuration attained by squeezing or pinching neck 14 of bag 10.

Figure 5:
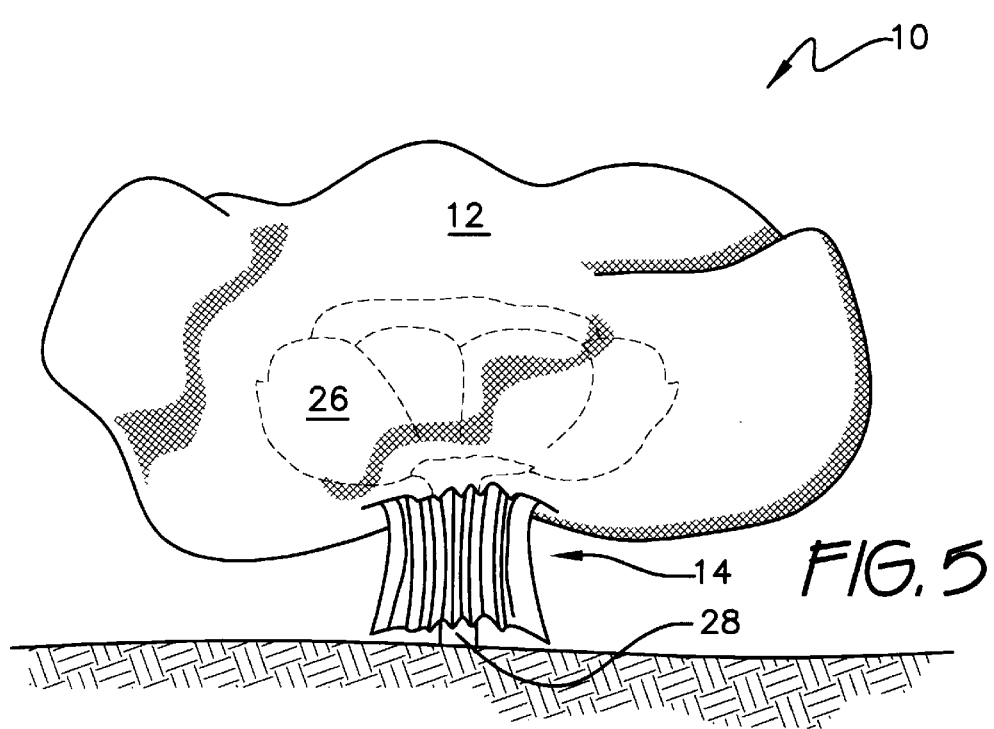
FIG. 5 is an environmental, side elevational view of the invention utilized with a plant projecting from the ground.

Referring now to FIGS. 4 and 5, novel bag 10 may be placed over a fruit or vegetable component 26 of a plant (not shown in its entirety), so that only stem 28 is visible. Neck 14 has been squeezed so that opposing walls of neck 14 engage one another to close neck 14. Bag 10 may be left in this condition until the plant component 26 is ready for harvest or retrieval. At that time, a person may pull neck 14 open and remove bag 10, thereby exposing plant component 26. As shown in FIGS. 4 and 5, this operation may be performed both on plant components 26 depending from a tree and on plant components 26 projecting upwardly on a stem or stalk from the ground.

It will be appreciated that a slight opening enabling stem 28 to penetrate past neck 14 may be located selectively at any desired location along neck 14. Bag 10 may thus be oriented relative to the protected plant in any desired location or position. For example, one bag 10 may span two adjacent plant components 26, with neck 14 being closed over each individual respective stem. This arrangement may require that each stem 28 be located at one end of neck 14. Self-closing properties of neck 14 would accommodate such positioning and sealing. The non-setting nature of wax, where wax is employed, assures that the wax will be sufficiently tacky or yielding to enable a person to pull open neck 14 for retrieval of the protected plant components 26.

Bag 10 may be fabricated by folding a rectangular section of suitable fabric over onto itself and bonding opposing edges of the section of fabric at seams 30, 32 (see FIG. 1), thereby forming a pocket open at the top. Seams 30, 32 may be bonded in any suitable way, such as adhering, stitching, or thermal or ultrasonic welding. To form the embodiment of FIG. 2, the partially formed bag may then be inverted and dipped into melted beeswax. Once the beeswax has cooled to solidification, the resultant bag 10 will be ready for service.

Alternative methods of lining neck 14 with a suitable wax will at a minimum cause the interior of neck 14 to be coated with wax. This assures that manual squeezing or pinching of neck 14 will cause adhesion of two sides of neck 14 to one another.

The embodiment of FIG. 3 may be fabricated by securing metal foil tape to the partially completed bag, as set forth above. Alternatively, foil 22 may be secured to the panel of material forming body 12 prior to bonding seams 26, 28.

Preferably, bag 10 has pigmentation of a hue selected to repel a pest. Different pests respond to different hues. Such hues are known and are periodically reported in publications such as Organic Gardening. An appropriate hue may be selected by referring to Organic Gardening or any other publication reporting information on visual repulsion of pests, and imparted to the fabric of body 12. Colors, if imparted to bag 10, may include patterns as well as solid coloring of the entire bag 10.

It is to be understood that the present invention is not limited to the embodiments described above, but encompasses any and all embodiments within the scope of the following claims.

We claim:

1. A bag having a closed body and a neck lined with beeswax, said closed body comprising a material which has small openings formed therein, said small openings being air permeable, water permeable, and light permeable material, and of sufficiently small diameter to exclude insects, whereby said neck may be closed selectively in a selected location along said neck and adhered closed at said selected location, and whereby neck adheres to itself and also to plant stems, and said bag can be pulled open by manual effort after sealing said neck, said body bearing pigment of a hue selected to repel a pest.

2. A bag having a closed body and a neck having a lining disposed thereon, said lining comprising a malleable material which closes said neck by inelastic deformation and which maintains a configuration attained after being manipulated, said lining comprising wax having adhesive qualities and cohesive properties, whereby said neck may be closed selectively in a selected location along said neck and is maintained closed at said selected location, and where said lining adheres to said bag and also to plant stems, and further where said bag can be pulled open by manual effort after sealing said neck.

3. The bag according to claim 2, said closed body comprising a material which has small openings formed therein, said small openings being air permeable, water permeable, and light permeable material, and of sufficiently small diameter to exclude insects.

4. The bag according to claim 2, further bearing pigment of a hue selected to repel a pest.

5. The bag according to claim 2, said neck further comprising a lining of metal foil, whereby closure of said neck is enabled by crumpling said lining of metal foil.

6. The bag according to claim 1, said wax being beeswax.

7. The bag according to claim 1, said lining being artificial wax.

* * * * *